(12) United States Patent
Okuyama

(10) Patent No.: US 7,447,422 B2
(45) Date of Patent: Nov. 4, 2008

(54) DATA RECORDING DEVICE, DATA RECORDING METHOD, AND RECORDING CONTROL PROGRAM

(75) Inventor: Tomoyuki Okuyama, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 809 days.

(21) Appl. No.: 10/900,133

(22) Filed: Jul. 28, 2004

(65) Prior Publication Data

US 2005/0031313 A1    Feb. 10, 2005

(30) Foreign Application Priority Data

Aug. 4, 2003 (JP) ............................. 2003-286009
Jun. 25, 2004 (JP) ............................. 2004-187901

(51) Int. Cl.
*H04N 5/00* (2006.01)
*H04N 7/26* (2006.01)

(52) U.S. Cl. ........................................ 386/125; 386/109

(58) Field of Classification Search ................ 386/125, 386/109, 111, 112, 46, 124, 27, 33
See application file for complete search history.

(56) References Cited

U.S. PATENT DOCUMENTS 5,377,051 A * 12/1994 Lane et al. .................... 386/81

2003/0123540 A1 * 7/2003 Zhong et al. ............ 375/240.07
2006/0251330 A1 * 11/2006 Toth et al. .................... 382/236

FOREIGN PATENT DOCUMENTS

| JP | H10-134548 | 5/1998 |
|---|---|---|
| JP | 2002-056609 | 2/2002 |
| JP | 2002-335495 | 11/2002 |

\* cited by examiner

*Primary Examiner*—Robert Chevalier
(74) *Attorney, Agent, or Firm*—Sughrue Mion, PLLC

(57) ABSTRACT

A data recording device for recording video data and/or audio data on a recording medium comprises a compression-encoding unit for compressing and encoding an inputted data stream, hierarchizing a variable data block, and blocking a plurality of generated lower-level data blocks as an upper-level data block, a data block temporary storage unit for temporality storing at least one upper-level data block generated in the compression-encoding unit and including n number (n is a given natural number) of lower-level data blocks; and a control unit for managing a size of the upper-level data block generated in the compression-encoding unit and controlling the compression-encoding unit to perform blocking of data blocks in such a way that the upper-level data block includes a plurality of lower-level data blocks to an extent that a size of the upper-level data block does not exceed a capacity of the data block temporary storage unit.

15 Claims, 6 Drawing Sheets

DATA RECORDING DEVICE, DATA RECORDING METHOD, AND RECORDING CONTROL PROGRAM

BACKGROUND OF THE INVENTION

1. Field of the Invention

The present invention particularly relates to a data recording device, data recording method, and recording control program for recording data in compliance with Digital Versatile Disc (DVD)-Video specifications.

2. Description of Related Art

DVD is the next standard of high-capacity optical discs to replace Compact Disc (CD). Video data and audio data are recorded on DVD (DVD-R, DVD-RW, DVD-RAM, and so on) as a recording medium. The recorded data is compressed and encoded in accordance with the DVD-Video specifications, for example.

Referring first to FIG. 10, a DVD recording device 101 as a data recording device has a system controller 102, encoder 103, stream buffer memory 104, and disc unit 106. The system controller 102 controls the operation of each component of the DVD recording device 101. The encoder 103 compresses and encodes video data and audio data using Moving Picture Expert Group (MPEG)-2 technology. The stream buffer memory 104 is used to supplement the contents of Navigation pack, which is referred to hereinafter as "NV_PCK", such as playback control information contained in a data stream generated in the encoder 103. The disc unit 106 has an optical head to write data onto a recording medium 105 composed of DVD.

A data stream consists of a series of cells. Each cell includes a plurality of Video Object Units (VOBUs). The NV_PCK is placed at the beginning of each VOBU and composed of data for controlling playback of video data and audio data, and data for providing support for special playback modes such as skip playback, as described in Japanese Unexamined Patent Application Publications 2002-56609 and 10-134548, for example. In the DVD-VIDEO specifications, the maximum number of cells is limited to 255.

The encoder 103 compresses and encodes video data and audio data to generate a data stream. The number of VOBUs in one cell is a fixed value corresponding to a recording time.

The encoder 103 performs the compression encoding using a variable bit rate control method. The variable bit rate control method varies a video bit rate, which is an amount of data per unit time, according to a variation in video data.

A minimum capacity of the stream buffer memory 104 is the size of one cell. A maximum size of one cell is determined based on the maximum size of VOBU (maximum code amount) and the number of VOBUs in one cell. The number of VOBUs in one cell is fixed.

Thus, a capacity Q[Mb] of the stream buffer memory 104 is given by the following equation (1):

$$Q=(RV+RA)(N/RF)V \qquad (1)$$

where RV is a maximum video bit rate [Mbps], RA is an audio bit rate [Mbps] as an amount of audio data per unit time, N is the number (N) of video frames or the number of still frames included in one VOBU, RF is a video frame rate [Hz] or a still frame rewriting frequency, and V is the number of VOBUs in one cell. The maximum video bit rate RV is set to a given value in order to keep a constant image quality.

In this way, the capacity Q of the stream buffer memory 104 is determined according to the maximum video bit rate that varies by the variable bit rate control performed by the encoder 103. Use of the sufficiently large capacity Q allows all the data in one cell to be always stored in the stream buffer memory 104.

If, on the other hand, the capacity Q of the stream buffer memory 104 is predetermined, the fixed value of the number of VOBUs in one cell is adjusted. This adjustment allows all the data in one cell to be always stored in the stream buffer memory 104.

A maximum recording time tmax is given by the following equation (2):

$$tmax=CV(N/RF) \qquad (2)$$

where C is the number of cells, which is C=255. Thus, the maximum recording time tmax varies with the number of VOBUs, V, in one cell.

SUMMARY OF THE INVENTION

In the above technique, if the capacity Q of the stream buffer memory 104 is determined according to the maximum video bit rate, the capacity Q is set larger than an actual size of one cell. This causes the problem that a high-capacity stream buffer memory is required, increasing device costs.

Further, if the capacity Q of the stream buffer memory 104 is predetermined to a relatively low value, the fixed number of VOBUs in one cell should be reduced accordingly. Since the maximum number of cells is limited, this causes the problem that the recording time is limited by the capacity of the stream buffer memory 104.

According to first aspect of this invention, a data recording device for recording video data and/or audio data on a recording medium comprises a compression-encoding unit for compressing and encoding an inputted data stream, hierarchizing a variable data block, and blocking a plurality of generated lower-level data blocks as an upper-level data block, a data block temporary storage unit for temporality storing at least one upper-level data block generated in the compression-encoding unit and including n number (n is a given natural number) of lower-level data blocks; and a control unit for managing a size of the upper-level data block generated in the compression-encoding unit and controlling the compression-encoding unit to perform blocking of data blocks in such a way that the upper-level data block includes a plurality of lower-level data blocks to an extent that a size of the upper-level data block does not exceed a capacity of the data block temporary storage unit, wherein, upon receiving a generation completion signal indicating completion of generating a lower-level data block from the compression-encoding unit, if a total size of a plurality of lower-level data blocks counted from a beginning of a currently generated upper-level data block in the compression-encoding unit is equal to or larger than a difference between the capacity of the data block temporary storage unit and a size of a maximum lower-level data block of the plurality of the lower-level data blocks, the control unit makes an end process request for performing an end process to determine the lower-level data block which has just been generated as a last lower-level data block to be included in the currently generated upper-level data block, to the compression-encoding unit.

According to second aspect of this invention, the compression-encoding unit performs variable bit rate control that varies a video bit rate as an amount of data per unit time in accordance with a variation in video data, and the size of the maximum lower-level data block is a product of a sum of a maximum value of the video bit rate and an audio bit rate as an amount of audio data per unit time, times a value of a number of video frames as a number of still frames included in one lower-level data block divided by a video frame rate as a still frame rewriting frequency.

According to third aspect of this invention, the compression-encoding unit generates the upper-level data block and the lower-level data blocks in compliance with DVD-Video specifications, and video data and/or audio data are recorded on a DVD as the recording medium.

According to fourth aspect of this invention, the compression-encoding unit sends, to the control unit, the generation completion signal upon every completion of generating a lower-level data block, and information including a number of packs contained in the lower-data block and defined by DVD-Video specifications, and the control unit calculates a total size of lower-level data blocks counted from a beginning of a currently generated upper-level data block in the compression-encoding unit, based on the number of packs.

According to fifth aspect of this invention, the upper-level data block and the lower-level data blocks are a cell and video object units, respectively, defined by DVD-Video specifications.

According to sixth aspect of this invention, if a number of lower-level data blocks included in an upper-level data block becomes equal to or more than a predetermined upper limit, the control unit makes an end process request for performing an end process to determine the lower-level data block which has just been generated as a last lower-level data block to be included in the currently generated upper-level data block, to the compression-encoding unit.

According to seventh aspect of this invention, the predetermined upper limit is determined based on a total recording time of a recording medium, a recording time corresponding to the upper-level data block, and a recording time corresponding to the lower-level data block.

According to eighth aspect of this invention, a data recording method for recording video data and/or audio data on a recording medium, comprises: performing a compression and encoding process on an inputted data stream, hierarchizing a variable data block, and blocking a plurality of generated lower-level data blocks as an upper-level data block; temporality storing at least one upper-level data block including n number (n is a given natural number) of lower-level data blocks; and after receiving a generation completion signal indicating completion of generating a lower-level data block, if a total size of a plurality of lower-level data blocks counted from a beginning of a currently generated upper-level data block in the compression and encoding process is equal to or larger than a difference between a capacity of a data block temporary storage unit and a predetermined value of a size of a maximum lower-level data block of the plurality of the lower-level data blocks, making an end process request for performing an end process to determine the lower-level data block which has just been generated as a last lower-level data block to be included in the currently generated upper-level data block.

According to ninth aspect of this invention, the compression and encoding process performs variable bit rate control that varies a video bit rate as an amount of data per unit time in accordance with a variation in video data, and a margin value is a product of a sum of a maximum value of the video bit rate and an audio bit rate as an amount of audio data per unit time, times a value of a number of video frames as a number of still frames included in one lower-level data block divided by a video frame rate as a still frame rewriting frequency.

According to tenth aspect of this invention, the compression and encoding process generates the upper-level data block and the lower-level data blocks in compliance with DVD-Video specifications, and video data and/or audio data are recorded on a DVD as the recording medium.

According to eleventh aspect of this invention, the compression and encoding process outputs the generation completion signal upon every completion of generating a lower-level data block, and information including a number of packs contained in the lower-data block and defined by DVD-Video specifications, and a total size of lower-level data blocks counted from a beginning of a currently generated upper-level data block in the compression-encoding process is calculated based on the number of packs.

According to twelfth aspect of this invention, the upper-level data block and the lower-level data blocks are a cell and video object units, respectively, defined by DVD-Video specifications.

According to thirteenth aspect of this invention, if a number of lower-level data blocks included in an upper-level data block becomes equal to or more than a predetermined upper limit, an end process to determine the lower-level data block which has just been generated as a last lower-level data block to be included in the currently generated upper-level data block is performed in the compression-encoding process.

According to fourteenth aspect of this invention, the predetermined upper limit is determined based on a total recording time of a recording medium, a recording time corresponding to the upper-level data block, and a recording time corresponding to the lower-level data block.

According to fifteenth aspect of this invention, a recording control program product, in a computer readable medium, for executing the data recording method described above.

The control unit of the present invention controls the compression-encoding unit to perform blocking of data blocks in such a way that an upper-level data block includes a plurality of lower-level data blocks to an extent that a size of the upper-level data block does not exceed a capacity of the data block temporary storage unit. This eliminates the need to unnecessarily increase the capacity of the data block temporary storage unit for safety purposes, thereby allowing device cost reduction.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

A data recording device according to a specific embodiment of the present invention is explained hereinafter with reference to the drawings. The explanation is given on a DVD recording device as an example of the data recording device of the present invention.

Figure 1:
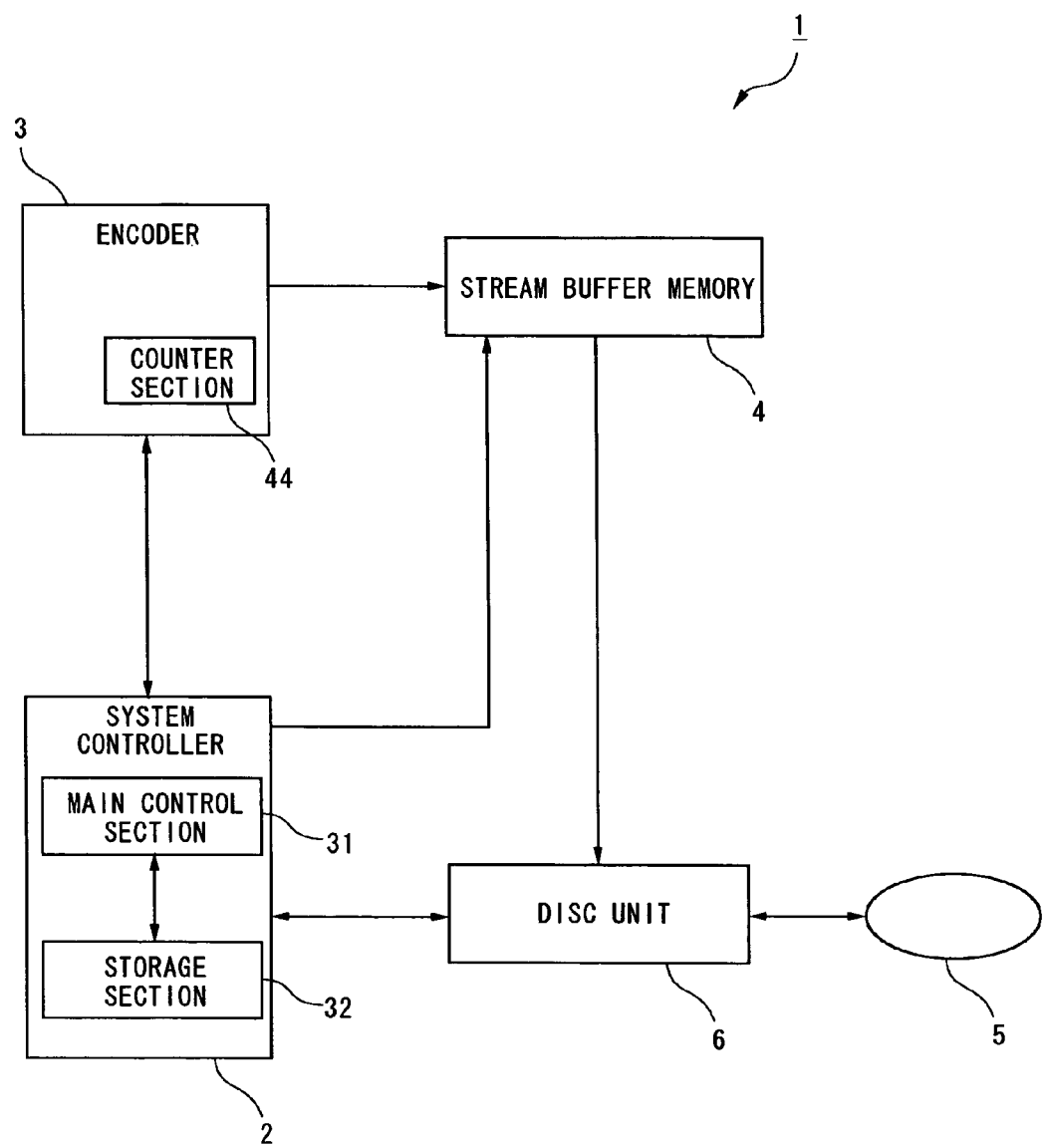
FIG. 1 is a block diagram illustrating the structure of a DVD recording device according to a specific embodiment of the present invention.

FIG. 1 is a block diagram illustrating the structure of a DVD recording device according to a specific embodiment of the present invention. The DVD recording device 1 shown in FIG. 1 records video data and audio data in compliance with DVD-Video specifications. The DVD recording device 1 has a system controller (control unit) 2, encoder (compression-encoding unit) 3, stream buffer memory (data block temporary storage memory) 4, and disc unit 6.

The system controller 2 is a circuit to control the operation of the components of the DVD recording device 1. The encoder 3 compresses and encodes video data and audio data. In this embodiment, the encoder 3 compresses data using MPEG-2, for example, and outputs the data stream. The stream buffer memory 4 has a given capacity to temporarily store data for one cell generated in the encoder 3. The disc unit 6 has an optical head to write data onto a recording medium 5, which is composed of DVD (DVD-R, DVD-RW, DVD-RAM, and so on).

Prior to explaining each component of the DVD recording device 1, data structure in compliance with the MPEG encoding method and DVD-Video specifications used in the DVD recording device 1 of this embodiment is explained below.

The MPEG stream is made up of a series of data frames composed of an I-picture, P-picture, and B-picture. The I-picture is an intra coded picture which completes compression inside frame. The P picture is forwardly predicted from a preceding reference frame picture. The B-picture is bi-directionally predicted from a combination of a preceding reference frame picture and a following reference frame picture. A normal frame rate is 15 frames per 0.5 second, which includes 1 I-picture, 4 P-pictures, and 10 B-pictures. The data thus encoded is then rearranged into the sequence for decoding each frame and recorded in compliance with the DVD-Video specifications described below.

Figure 2:
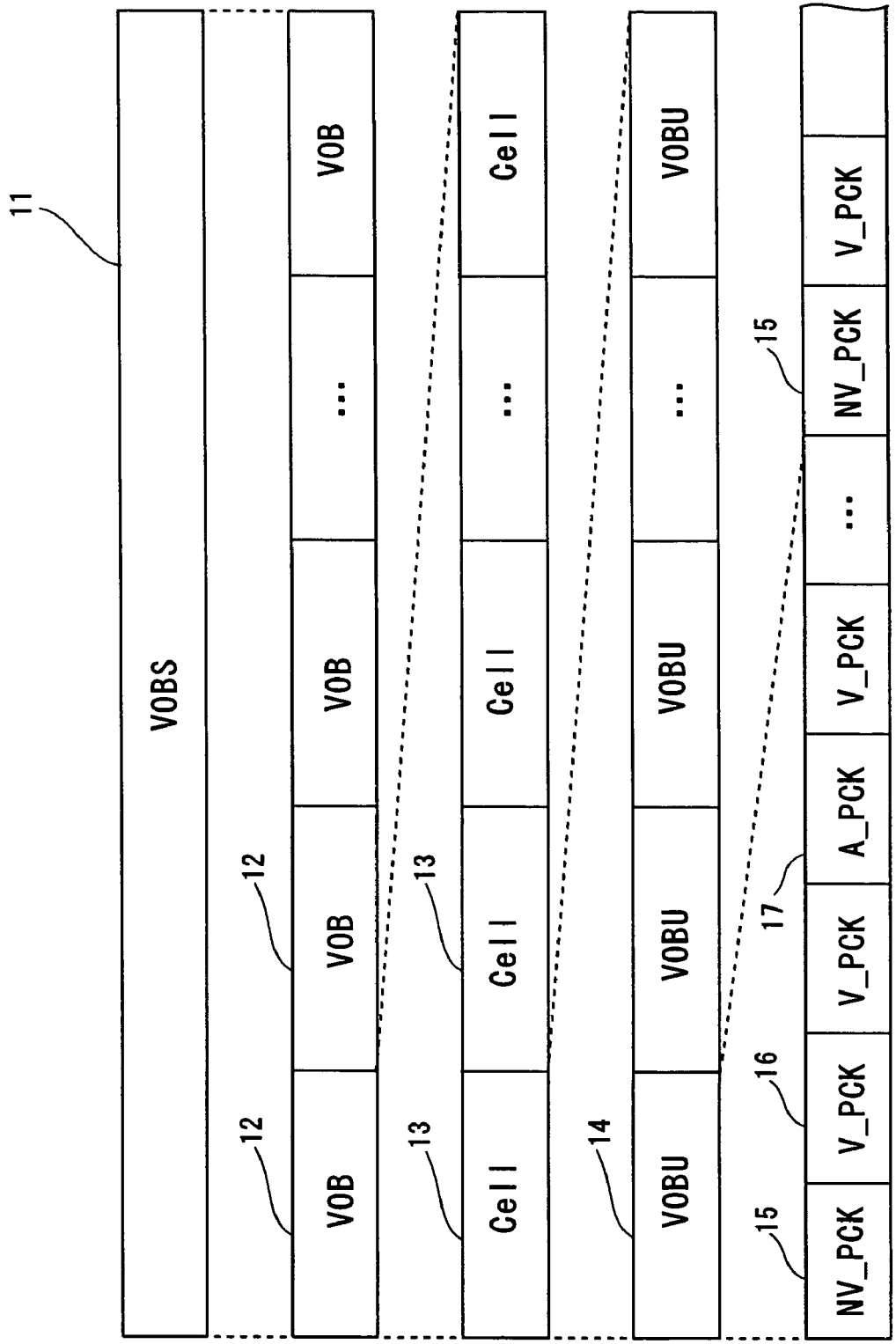
FIG. 2 is a diagram to explain the contents of a data stream generated in the DVD recording device.

In the DVD-Video specifications, video data and audio data are each divided into a plurality of Video Title Sets (VTS). Each VTS has a plurality of Video Object Sets (VOBS) 11, each of which is composed of a plurality of Video Objects (VOB) 12, 12 . . . , as shown in FIG. 2

Each VOB 12 is composed of at least one cell (upper-level data block) 13, 13, and the like. Each cell is composed of a plurality of VOBUs (lower-level data blocks) 14, 14, and the like.

The maximum number of cells 13 in one VOB is limited to 255. The amount of data in each VOBU 14 is set so that the corresponding playback time is 0.4 to 1 second, for example. Though FIG. 2 shows the structure where each VOB 12 is composed of a plurality of cells 13, 13, . . . , one VOB 12 is normally composed of one cell 13.

Each VOBU 14 has a NV_PCK 15, a plurality of Video Packs (which is referred to hereinafter as "V_PCK") 16, 16, . . . , and Audio Packs (hereinafter as "A_PCK") 17, 17, . . . The NV_PCK 15, which is placed at the beginning of each VOBU 14, contains control data. The V_PCK 16 contains video data, and the A_PCK 17 contains audio data.

The NV_PCK 15 contains data for controlling playback of the VOBU 14 and data for performing special playback such as skip playback. The order and number of V_PCK 16 and A_PCK 17 in each VOBU 14 are set arbitrarily. VOBU 14 can have no V_PCK 16 or no A_PCK 17. The NV_PCK 15, V_PCK 16, and A_PCK 17 each have a pack length of 2048 [byte].

Figure 3:
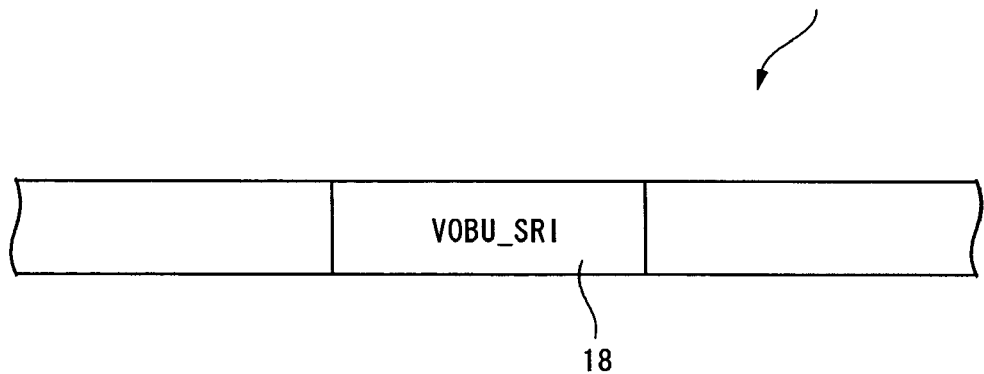
FIG. 3 is a diagram to explain the contents of a data stream generated in the DVD recording device.
Figure 4:
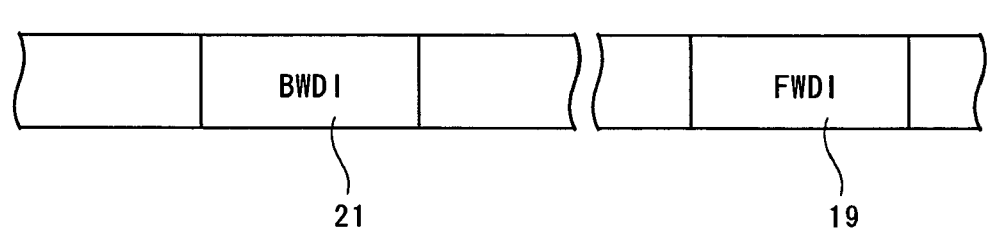
FIG. 4 is a diagram to explain the contents of a data stream generated in the DVD recording device.

Each NV_PCK 15 contains VOBU search information (hereinafter as "VOBU_SRI") 18 as a part of DSI packet (DSI_PKT), as shown in FIG. 3. The VOBU_SRI 18 contains forward information (FWDI) 19 and backward information (BWDI) 21, as shown in FIG. 4.

Figure 5:
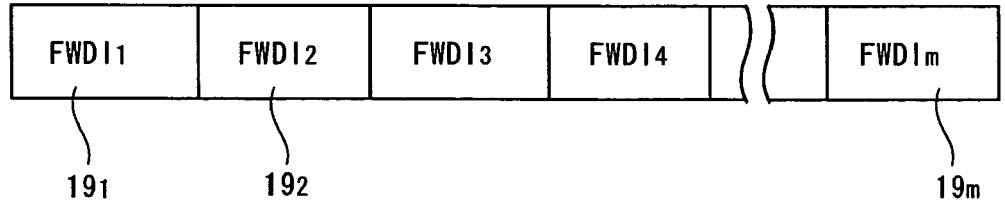
FIG. 5 is a diagram to explain the contents of a data stream generated in the DVD recording device.

The FWDI 19 contains pieces of top address information from the top address information (FWDI1) 191 of a next (future) VOBU 14 through the top address information (FWDIm) 19 m of a VOBU 14 which is at most m (m=240, for example) number of VOBUs after the currently generated VOBU 14 in the same cell 13, as shown in FIG. 5.

On the other hand, the BWDI 21 contains pieces of top address information from the top address information of a previous (past) VOBU 14 through the top address information of a VOBU 14 which is at most m (m=240, for example) number of VOBUs before the currently generated VOBU 14 in the same cell 13.

The structure and operation of each component of the DVD recording device 1 according to the present embodiment are explained hereinafter.

Figure 6:
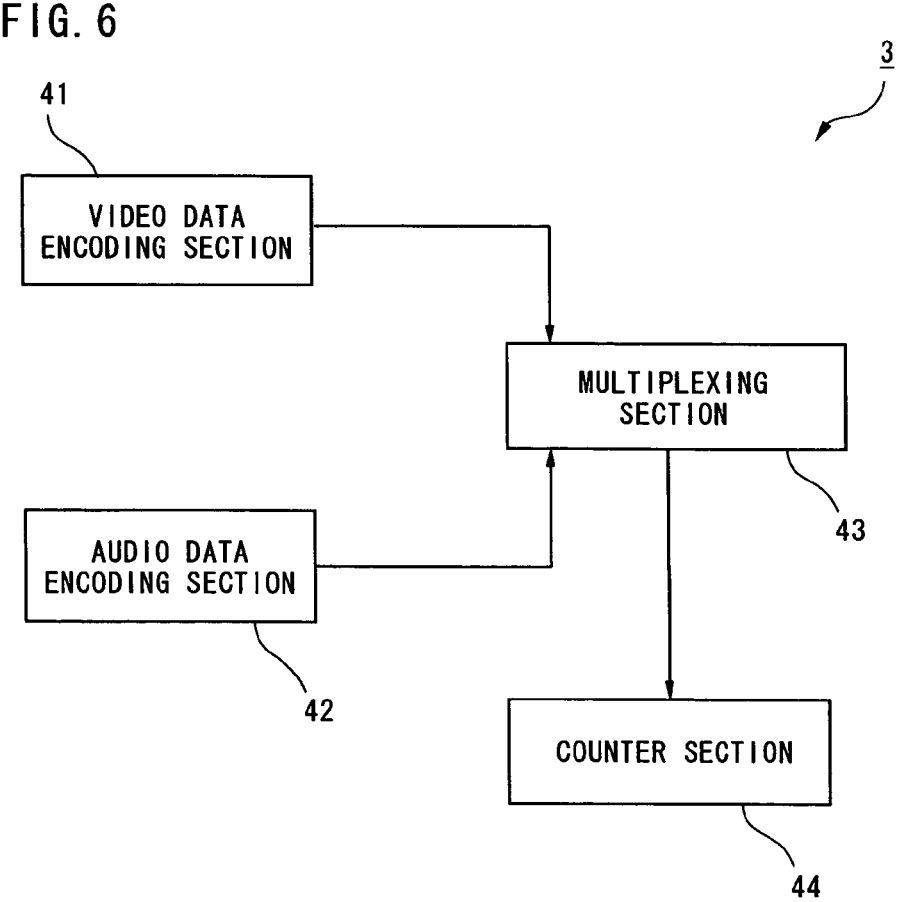
FIG. 6 is a block diagram illustrating the structure of an encoder in the DVD recording device.

The encoder 3 shown in FIG. 1 compresses and encodes inputted video data and audio data and then outputs a data stream having the data structure described above. Referring now to FIG. 6, the encoder 3 has a video data encoding section 41, audio data encoding section 42, multiplexing section 43, and counter section 44. The video data encoding section 41 performs MPEG-2 compression encoding on a video signal which is inputted from a camera, for example, and digitized. The audio data encoding section 42 performs compression encoding on an audio signal which is inputted from a microphone, for example, and digitized. The multiplexing section 43 multiplexes (packet-multiplexes) the compressed encoded video data and audio data into one stream. The counter section 44 counts the number of packs contained in the VOBU 14 and the total number of VOBUs in the currently generated cell 13, and sends the obtained counting information together with completion information to the system controller 2 after a VOBU 14 is generated.

In this example, the encoder 3 performs compression and encoding using the variable bit rate control method that varies a video bit rate according to a variation in video data. The audio bit rate is fixed. In the data stream generated in the encoder 3, FWDI 19 in the NV_PCK 15 of each VOBU 14 is blank.

Further, the encoder 3 can generate a last VOBU 14 based on a cell end process request described later. Upon generating the last VOBU, the encoder 3 ends one cell 13 and outputs the data stream to the stream buffer memory 4. After the last VOBU is generated, time information contained in the NV_PCK 15 is reset to start recounting the time information.

The stream buffer memory 4 is a temporary storage memory having a given capacity Q. The data stream outputted from the encoder 3 is temporarily stored in the stream buffer memory 4. The stored data stream corresponds to data for one cell in the data structure described above. In the stream buffer memory 4, data is written into the blank FWDI 19 under the control of the system controller 2.

The system controller 2 controls the operation of each component. Referring back to FIG. 1, the system controller 2 has a main control section 31 and a storage section 32. The main control section 31 is composed of CPU and so on to execute various programs. The storage section 32 is composed of a semiconductor memory such as ROM and RAM to store various programs.

The storage section 32 has an information storage area and a program storage area. The information storage area stores configuration information, a capacity of the stream buffer memory 4, and so on. The program storage area stores various processing programs executed by the main control section 31, including a cell size management program, VOBU number management program, and navigation data supplement program. The main programs executed by the main control section 31 are explained below.

The navigation data supplement program describes a process for supplementing FWDI 19 data to a given blank area of a NV_PCK 15 in each VOBU 14 of the one cell data stored in the stream buffer memory 4.

The cell size management program describes a process for managing the size of a currently generated cell. The cell size management program calculates a total size S of the currently generated cell and sends a request for ending the cell to the encoder 3 based on the calculated cell size S.

The VOBU number management program describes a process for managing the number of VOBUs 14 included in one cell 13 based on VOBU number information sent from the counter section 44 of the encoder 3. The VOBU number management program can send a cell end process request to the encoder 3 based on the number M of VOBUs in one cell.

In sum, the system controller 2 sends a request for ending a cell to the encoder 3 while controlling the operation of each component. The cell end process request is outputted based on the size S of one cell or the number M of VOBUs in one cell. The cell size S and the VOBU number M in one cell to output the cell end process request are detailed later.

Figure 7:
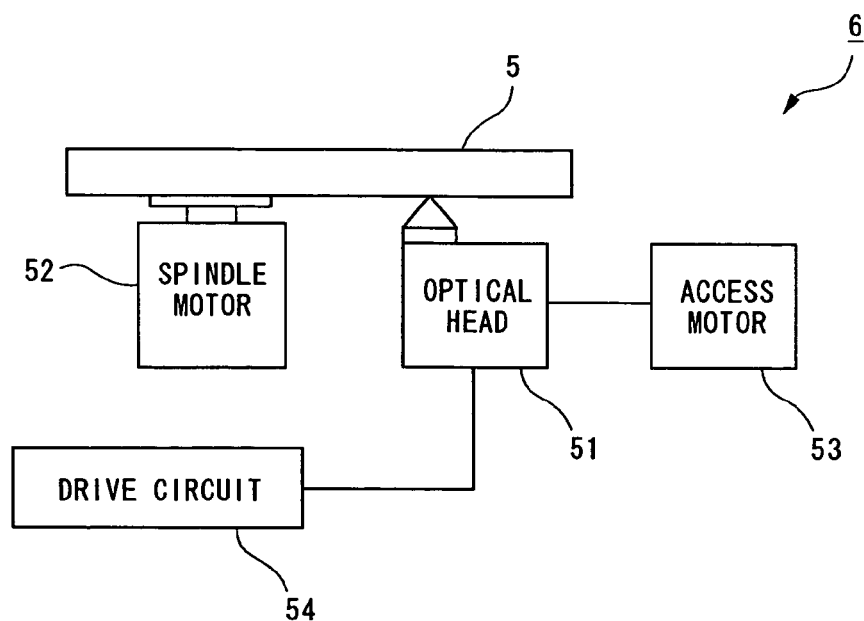
FIG. 7 is a block diagram illustrating the structure of a disc unit in the DVD recording device.

Referring then to FIG. 7, the disc unit 6 has an optical head 51, spindle motor 52, access motor 53, and drive circuit 54. The optical head 51 applies laser light emitted from a semiconductor laser device as a light source onto the recording medium 5, receives reflected light from the recording medium 5, and generates a signal corresponding to the received light intensity. The spindle motor 52 supports and rotates the recording medium 5. The access motor 53 moves the optical head 51 radially on the recording medium 5. The drive circuit 54 drives an actuator of the optical head 51.

The disc unit 6 receives the data sent from the stream buffer memory 4 through a modulator (not shown). The data inputted to the disc unit 6 is written to the recording medium 5.

The operation of each component of the DVD recording device 1 according to this embodiment is summarized as follows. The encoder 3 compresses and encodes inputted video data and audio data, and outputs the data as one cell data compliant to the DVD-Video specifications. The last VOBU in one cell is determined by a cell end process request outputted from the system controller 2. On the other hand, the system controller 2 outputs the cell end process request based on the size of cell or the number of VOBUs generated in the encoder 3. The stream buffer memory 4 stores the one cell data outputted from the encoder 3. Part of data in a NV_PCK is written to the stored data, and the data is then outputted to the disk unit 6. Finally, the disc unit 6 records the video data and audio data on the recording medium 5.

The operation of outputting a cell end process request for determining the last VOBU in a cell based on the cell size is explained below. The system controller 2 receives a VOBU 14 generation completion signal and counting information from the encoder 3. The system controller 2 calculates the total size of data S[Mb] from the beginning of the currently generated cell 13 through the VOBU 14 generated so far in this cell 13, which is, a product of the number of packs counted from the beginning of the cell 13 times a pack length. This operation is based on the cell size management program. Thus, the total size S of the cell is calculated based on the number of packs of VOBUs 14 which have been generated by that time. A cell end process request is outputted when the total cell size S satisfies the following equation (3):

$$S \geq (Q - S\max) \quad (3)$$

where Q is a capacity [Mb] of the stream buffer memory 4, and Smax is a maximum size [Mb] of one VOBU 14. A cell end process request is made when the total size of VOBUs 14 in one cell becomes equal to or more than (Q−Smax). The VOBU being generated when a VOBU generation completion signal is outputted is determined as the last VOBU in the cell.

The maximum size Smax of one VOBU 14 is given by the following equation (4):

$$S\max = (RV + RA)(N/RF) \quad (4)$$

where RV is a maximum video bit rate [Mbps], RA is an audio bit rate [Mbps], N is the number (n) of video frames in one VOBU, and RF is a video frame rate [Hz]. The maximum size Smax of one VOBU 14 is prestored in the information storage area of the storage section 32.

Since Smax is a maximum size of a VOBU 14, even if the first data of a generated VOBU 14 satisfies the equation (3), it never exceeds the value of Smax. Thus, determining a VOBU 14 where the total size of data counting from the beginning of the cell 13 exceeds the value of (Q−Smax) as the last VOBU 14 allows the size of one cell to never exceed the capacity of the stream buffer memory 4.

A VOBU 14 next to the VOBU determined as the last VOBU 14 serves as the first VOBU 14 of the next cell 13. Hence, in no case, one VOBU 14 crosses over the two successive cells 13.

As described above, the DVD recording device 1 according to the present embodiment is capable of certainly storing one cell data in the stream buffer memory 4 since a cell end process request is outputted based on the cell size S.

Further, a case where a cell end process request is outputted based on the number of VOBUs 14 included in one cell is explained below. The system controller 2 counts the number M of VOBUs in a cell based on information outputted from the counter section 44 of the encoder 3. The system controller 2 outputs a cell end process request when the number of VOBUs, M, reaches a predetermined upper limit L. The L-th VOBU is thereby determined as the last VOBU so as to exclude the next VOBU (L+1-th VOBU) from the currently generated cell.

Outputting the cell end process request based on the cell size $S \geq Q - S\max$ allows efficient use of the stream buffer memory 4. However, ending a cell based only on the cell size causes the number of VOBUs in one cell to vary widely. The wide variation can lead to uneven search operation such as fast-forwarding and rewinding when playing back the recorded data. The search operation searches an I-picture at the beginning of each VOBU, and decodes and displays the I-picture only. Thus, smaller variation in the number of VOBUs in one cell offers more constant playback time of I-pictures, which provides entirely seamless playback of I-pictures and smooth display during search. For this reason, a cell end process request may be outputted when the number of VOBUs reaches the upper limit L, in addition to when the cell size S satisfies the above condition. The number M of VOBUs included in one cell thus satisfies the following equation (5):

$$Q/S\max \leq M \leq L \qquad (5)$$

The upper limit L is appropriately determined by a total recording time H, a capacity of the stream buffer, a speed of search operation, and so on. In this embodiment, the upper limit L is the number of VOBUs included in a normal cell calculated from an average playback time corresponding to one cell and an average playback time corresponding to one VOBU.

Specifically, if the recording medium 5 has a total recording time H and records one VTS composed of cells 13 (VOBs 12) of 255 or less, the upper limit L is given by the following equation (6):

$$L = H/(255-P)/\text{average playback time of one VOBU} \qquad (6)$$

where P is a permissible value. The permissible value P is calculated from a total recording time H, a capacity Q of the stream buffer memory, a speed of search operation, and so on.

Dividing the total recording time H by the number of cells gives an average playback time of one cell. Further, dividing the average playback time of one cell by an average playback time of one VOBU gives an upper limit L of the number of VOBUs which can be included in a normal cell.

If the permissible value P=15 and the average playback time of one VOBU is 0.5 seconds in the above equation (6), the relationship between the total recording time H and the upper limit L is as follows:

TABLE 1

| H (hour) | L (VOBU) | P |
| --- | --- | --- |
| 10 | 300 | 15 |
| 8 | 240 | 15 |
| 6 | 180 | 15 |
| 4 | 120 | 15 |
| 2 | 60 | 15 |
| 1 | 30 | 15 |

The operation of the DVD recording device 1 according to the embodiment detailed above is explained hereinafter with reference to FIG. 8.

Upon completion of generating a VOBU 14, the encoder 3 sends completion information and counting information of the number of packs in the VOBU 14 and the number of VOBUs in a currently generated cell 13 to the system controller 2.

Figure 8:
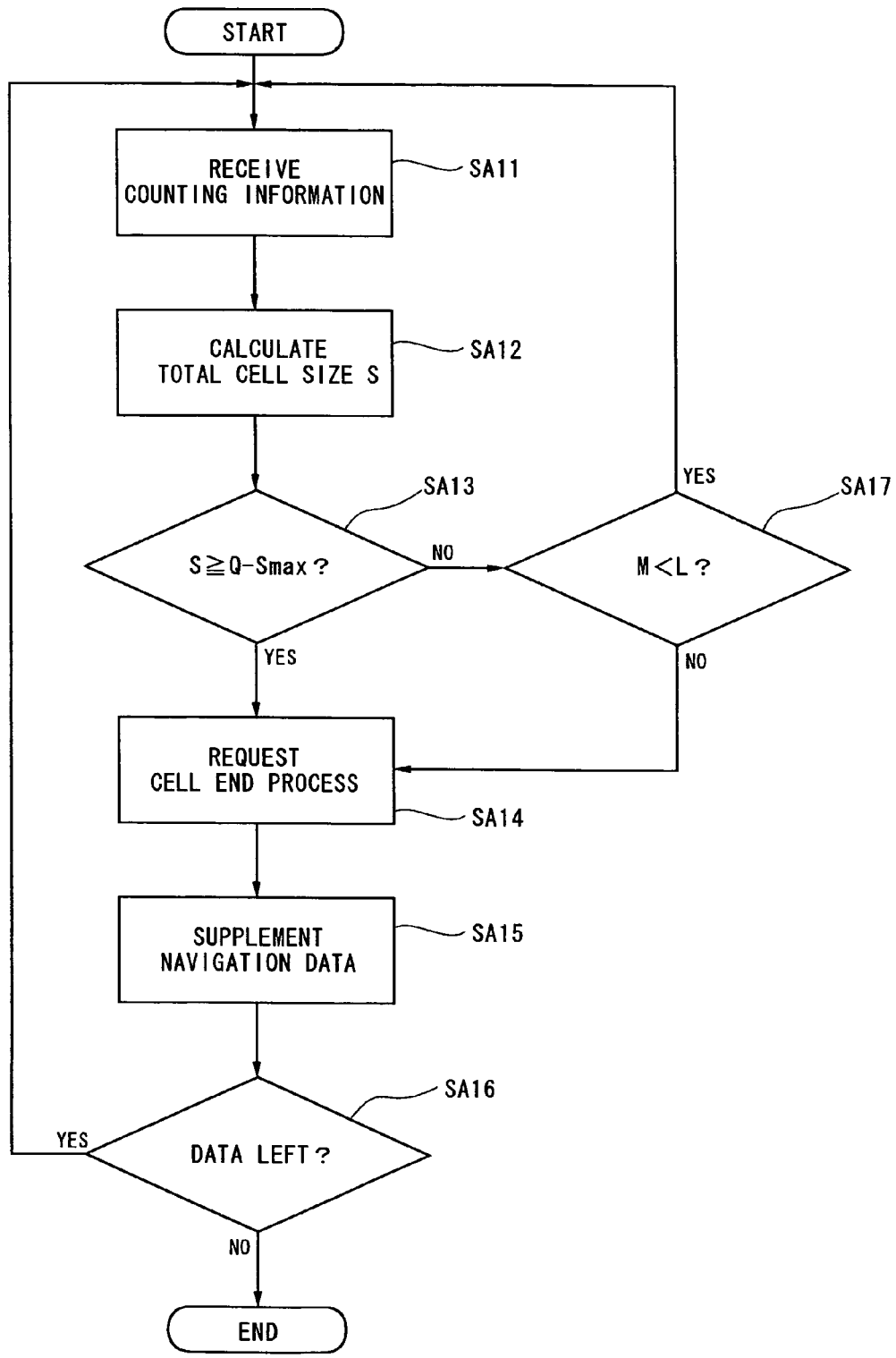
FIG. 8 is a flowchart to explain the operation of the DVD recording device.

In the system controller 2, the main control section 31 receives the completion information and the counting information sent from the encoder 3 (Step SA 11 in FIG. 8). The system controller 2 then counts from the beginning of a cell 13 based on the pack number information contained in the counting information and calculates a total size S of the cell 13 generated so far, which is, a product of the number of packs counted from the beginning of the cell 13 times a pack length (SA 12).

After that, the main control section 31 determines if the relationship given by the equation (3) is satisfied (SA 13). If it is satisfied, the process proceeds to Step SA 14, and if not, proceeds to SA 17.

In Step SA 17, the main control section 31 determines if the number M of VOBUs included in the cell 13 exceeds the upper limit L, that is, if M<L is satisfied or not. If the number of VOBUs, M, does not exceed the upper limit L, the process returns to Step SA 11; if M reaches L, proceeds to SA 14.

In Step SA 14, the main control section 31 sends an end process signal to the encoder 3. The end process signal is a signal for requesting a cell end process, which is a process of resetting time information after generating the last VOBU.

Figure 9:
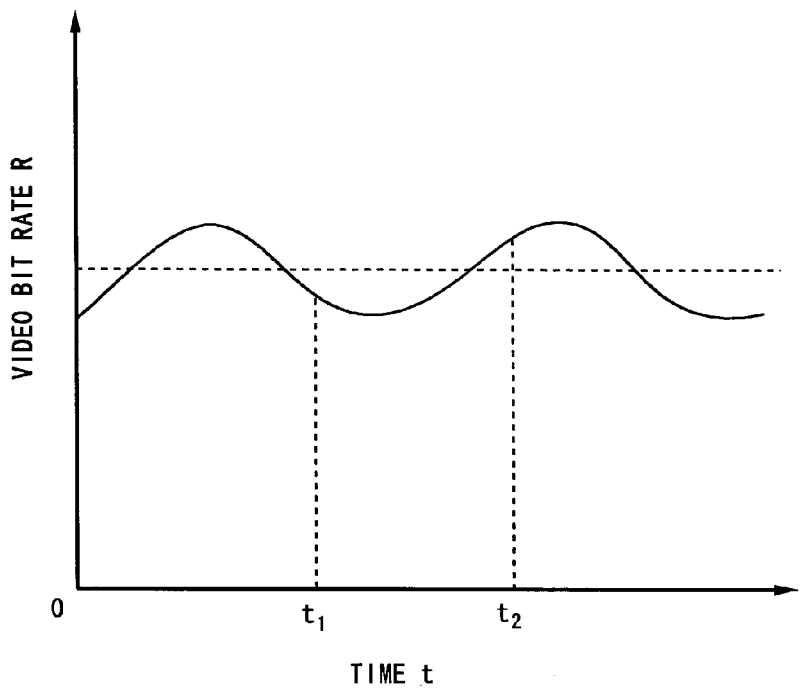
FIG. 9 is a graph to explain the operation of the DVD recording device.
Figure 10:
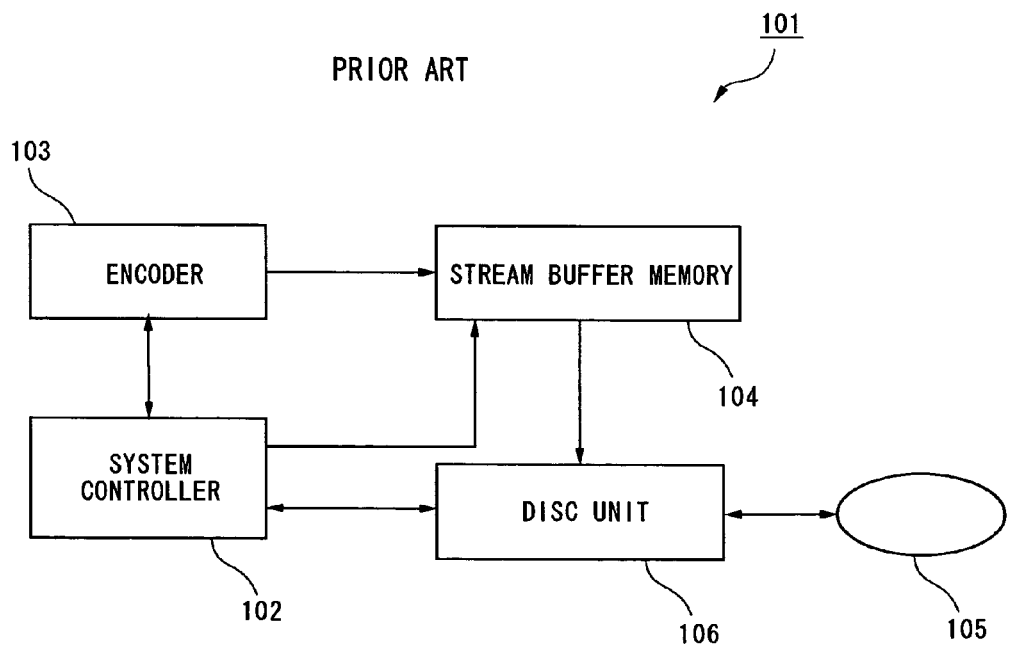
FIG. 10 is a diagram to explain a conventional technique.

The encoder 3 performs compression encoding using the variable bit rate control method that varies a video bit rate R with time t in accordance with a variation in video data, as shown in FIG. 9. The end process is performed when time integrated value of the video bit rate R is at a given value, which is, for example, t=t1, t2, and so on.

When data for one cell is sent from the encoder 3 to the stream buffer memory 4, the main control section 31 supplements FWDI 19 to a given blank area of a NV_PCK 15 in each VOBU 14 of the data stored in the stream buffer memory 4, based on navigation information sent from the encoder 3 (SA 15).

Proceeding to Step SA 16, the main control section 31 determines if there is data to be sent. If there is data, the process returns to SA 11; if there is no data, the process ends.

In this structure, the main control section 31 counts the number of VOBUs 14 from the beginning of the cell 13 which is currently generated in the encoder 3. The main control section 31 controls the operation to execute the process of ending the cell 13 before the total size of the VOBUs 14 generated so far exceeds the capacity Q of the stream buffer memory 4. Since the system controller 2 controls the encoder 3 at real-time according to the currently generated cell 13, there is no need to unnecessarily increase the capacity Q of the stream buffer memory 4 for safety purposes. This allows device cost reduction.

Further, even if the capacity Q of the stream buffer memory 4 is predetermined to a relatively small value, there is no need to equally reduce the number of VOBUs in one cell, unlike the conventional technique.

Besides, since the upper limit L is set for the number of VOBUs in one cell based on a total recording time H and the capacity Q of the stream buffer memory, it is possible to smooth the display during search operation and so on.

Though the flowchart in FIG. 8 explains the case of setting the upper limit L of the number of VOBUs in one cell, the cell end process request may be outputted based only on the cell size S if a variation in the display of search operation and so on is negligible. Specifically, the process in FIG. 8 may omit Step SA 17 and return to SA 11 if the equation (3) is not satisfied in SA 13.

In this case, the number of VOBUs in each cell can increase, and a maximum recording time tmax can increase accordingly. The maximum recording time tmax is expressed by the following equation.

The more the number of VOBUs 14 included in one cell 13 is, the longer the maximum recording time tmax given by the equation (7) is:

$$t\max = (\Sigma i = 1\ 255\ Vi)(N/RF)$$

where Vi is the number of VOBUs 14 included in the i-th cell.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A data recording device for recording video data and/or audio data on a recording medium, comprising:

a compression-encoding unit for compressing and encoding an inputted data stream, hierarchizing a variable data block, and blocking a plurality of generated lower-level data blocks as an upper-level data block;

a data block temporary storage unit for temporality storing at least one upper-level data block generated in the compression-encoding unit and including n number (n is a given natural number) of lower-level data blocks; and a control unit for managing a size of an upper-level data block generated in the compression-encoding unit and controlling the compression-encoding unit to perform blocking of data blocks in such a way that an upper-level data block includes a plurality of lower-level data blocks to an extent that a size of the upper-level data block does not exceed a capacity of the data block temporary storage unit, wherein, upon receiving a generation completion signal indicating completion of generating a lower-level data block from the compression-encoding unit, if a total size of a plurality of lower-level data blocks counted from a beginning of a currently generated upper-level data block in the compression-encoding unit is equal to or larger than a difference between the capacity of the data block temporary storage unit and a size of a maximum lower-level data block of the plurality of the lower-level data blocks, the control unit makes an end process request for performing an end process to determine the lower-level data block which has just been generated as a last lower-level data block to be included in the currently generated upper-level data block, to the compression-encoding unit.

2. The data recording device according to claim 1, wherein the compression-encoding unit performs variable bit rate control that varies a video bit rate as an amount of data per unit time in accordance with a variation in video data, and the size of the maximum lower-level data block is a product of a sum of a maximum value of the video bit rate and an audio bit rate as an amount of audio data per unit time, times a value of a number of video frames as a number of still frames included in one lower-level data block divided by a video frame rate as a still frame rewriting frequency.

3. The data recording device according to claim 1, wherein the compression-encoding unit generates the upper-level data block and the lower-level data blocks in compliance with DVD-Video specifications, and video data and/or audio data are recorded on a DVD as the recording medium.

4. The data recording device according to claim 1, wherein the compression-encoding unit sends, to the control unit, the generation completion signal upon every completion of generating a lower-level data block, and information including a number of packs contained in the lower-data block and defined by DVD-Video specifications, and the control unit calculates a total size of lower-level data blocks counted from a beginning of a currently generated upper-level data block in the compression-encoding unit, based on the number of packs.

5. The data recording device according to claim 1, wherein the upper-level data block and the lower-level data blocks are a cell and video object units, respectively, defined by DVD-Video specifications.

6. The data recording device according to claim 1, wherein, if a number of lower-level data blocks included in an upper-level data block becomes equal to or more than a predetermined upper limit, the control unit makes an end process request for performing an end process to determine the lower-level data block which has just been generated as a last lower-level data block to be included in the currently generated upper-level data block, to the compression-encoding unit.

7. The data recording device according to claim 6, wherein the predetermined upper limit is determined based on a total recording time of a recording medium, a recording time corresponding to the upper-level data block, and a recording time corresponding to the lower-level data block.

8. A data recording method for recording video data and/or audio data on a recording medium, comprising:

performing a compression and encoding process on an inputted data stream, hierarchizing a variable data block, and blocking a plurality of generated lower-level data blocks as an upper-level data block;

temporality storing at least one upper-level data block including n number (n is a given natural number) of lower-level data blocks; and after receiving a generation completion signal indicating completion of generating a lower-level data block, if a total size of a plurality of lower-level data blocks counted from a beginning of a currently generated upper-level data block in the compression and encoding process is equal to or larger than a difference between a capacity of a data block temporary storage unit and a predetermined value of a size of a maximum lower-level data block of the plurality of the lower-level data blocks, making an end process request for performing an end process to determine the lower-level data block which has just been generated as a last lower-level data block to be included in the currently generated upper-level data block.

9. The data recording method according to claim 8, wherein the compression and encoding process performs variable bit rate control that varies a video bit rate as an amount of data per unit time in accordance with a variation in video data, and the size of the maximum lower-level data block is a product of a sum of a maximum value of the video bit rate and an audio bit rate as an amount of audio data per unit time, times a value of a number of video frames as a number of still frames included in one lower-level data block divided by a video frame rate as a still frame rewriting frequency.

10. The data recording method according to claim 8, wherein the compression and encoding process generates the upper-level data block and the lower-level data blocks in compliance with DVD-Video specifications, and video data and/or audio data are recorded on a DVD as the recording medium.

11. The data recording method according to claim 8, wherein the compression and encoding process outputs the generation completion signal upon every completion of generating a lower-level data block, and information including a number of packs contained in the lower-data block and defined by DVD-Video specifications, and a total size of lower-level data blocks counted from a beginning of a currently generated upper-level data block in the compression-encoding process is calculated based on the number of packs.

12. The data recording method according to claim 8, wherein the upper-level data block and the lower-level data blocks are a cell and video object units, respectively, defined by DVD-Video specifications.

13. The data recording method according to claim 8, wherein, if a number of lower-level data blocks included in an upper-level data block becomes equal to or more than a predetermined upper limit, an end process to determine the lower-level data block which has just been generated as a last lower-level data block to be included in the currently generated upper-level data block is performed in the compression-encoding process.

14. The data recording method according to claim 13, wherein the predetermined upper limit is determined based on a total recording time of a recording medium, a recording time corresponding to the upper-level data block, and a recording time corresponding to the lower-level data block.

15. A computer program product on a computer readable medium, storing a program for executing a data recording method on a computer, said method comprising:

performing a compression and encoding process on an inputted data stream, hierarchizing a variable data block, and blocking a plurality of generated lower-level data blocks as an upper-level data block;

temporality storing at least one upper-level data block including n number (n is a given natural number) of lower-level data blocks; and after receiving a generation completion signal indicating completion of generating a lower-level data block, if a total size of a plurality of lower-level data blocks counted from a beginning of a currently generated upper-level data block in the compression and encoding process is equal to or larger than a difference between a capacity of a data block temporary storage unit and a predetermined value of a size of a maximum lower-level data block of the plurality of the lower-level data blocks, making an end process request for performing an end process to determine the lower-level data block which has just been generated as a last lower-level data block to be included in the currently generated upper-level data block.

* * * * *